United States Patent
Peisert

(10) Patent No.: US 8,182,316 B2
(45) Date of Patent: May 22, 2012

(54) OSCILLATINGLY DRIVEN MACHINE TOOL

(75) Inventor: Andreas Peisert, Stuttgart (DE)

(73) Assignee: C. & E. Fein GmbH (DE)

( * ) Notice: Subject to any disclaimer, the term of this patent is extended or adjusted under 35 U.S.C. 154(b) by 607 days.

(21) Appl. No.: 12/363,290

(22) Filed: Jan. 30, 2009

(65) Prior Publication Data

US 2009/0197514 A1 Aug. 6, 2009

(30) Foreign Application Priority Data

Feb. 1, 2008 (DE) .................... 20 2008 001 759 U

(51) Int. Cl.
*B24B 23/00* (2006.01)

(52) U.S. Cl. ........ 451/356; 451/357; 451/358; 451/342; 30/388

(58) Field of Classification Search ................. 451/342, 451/358, 357; 30/388; 83/571, 573, 698.41; 483/28
See application file for complete search history.

(56) References Cited

U.S. PATENT DOCUMENTS

| | | | | |
|---|---|---|---|---|
| 1,346,916 A * | 7/1920 | Shanklin | .................... | 234/38 |
| 4,779,382 A | 10/1988 | Rudolf et al. | | |
| 5,058,909 A * | 10/1991 | Rudolf et al. | .................... | 279/8 |
| 5,157,873 A * | 10/1992 | Rudolf et al. | .................... | 451/342 |
| 5,601,483 A * | 2/1997 | Rudolf et al. | .................... | 451/359 |
| 5,924,208 A * | 7/1999 | Saeki | .................... | 30/388 |
| 6,910,694 B2 * | 6/2005 | Hartmann et al. | .................... | 279/141 |
| 7,344,435 B2 | 3/2008 | Pollak et al. | | |
| 7,997,586 B2 * | 8/2011 | Ziegler et al. | .................... | 279/8 |
| 2007/0060030 A1 * | 3/2007 | Pollak et al. | .................... | 451/359 |
| 2007/0295156 A1 | 12/2007 | Ziegler et al. | | |

FOREIGN PATENT DOCUMENTS

EP 0253181 A2 1/1988
WO 2005102605 A1 11/2005

* cited by examiner

*Primary Examiner* — George Nguyen
(74) *Attorney, Agent, or Firm* — St. Onge Steward Johnston & Reens LLC

(57) ABSTRACT

The invention discloses an oscillatingly driven machine tool, having an oscillatory drive for driving a drive shaft about its longitudinal axis, having a flange provided on the drive shaft against which an oscillatory tool can be clamped by spring force via a counter flange, and having a displacing mechanism for displacing the counter flange between a working position in which the oscillatory tool is clamped by a spring between the flange and the counter flange and a released position in which the counter flange can be detached from the flange.

20 Claims, 1 Drawing Sheet

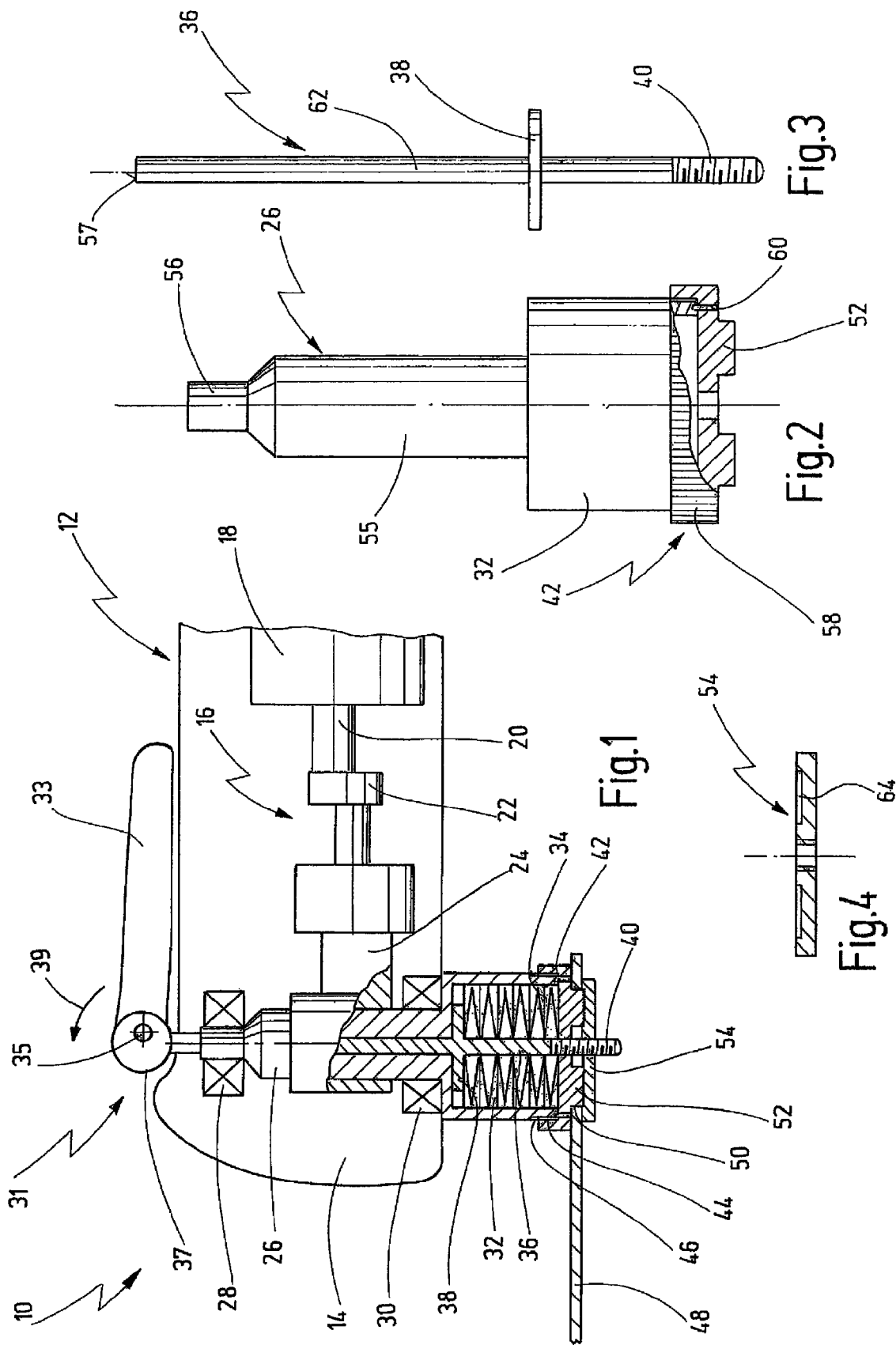

OSCILLATINGLY DRIVEN MACHINE TOOL

CROSS REFERENCES TO RELATED APPLICATIONS

This application claims priority of German utility model application DE 20 2008 001 759.9, filed on Feb. 1, 2008. The entire content of this priority application is incorporated herein by reference.

BACKGROUND OF THE INVENTION

The present invention relates to a machine tool adapted to be driven in an oscillating movement, having an oscillatory drive for driving a drive shaft about its longitudinal axis and a mounting means for mounting an oscillatory tool on the oscillatory drive.

Oscillating tools have been known for many years, and have been in use in various designs, for performing the various working operations. For example, machine tools adapted to be driven in an oscillating movement are used for grinding, for sawing and for cutting materials of various kinds. Special advantages are derived in particular insofar as risks of injury can be avoided when the tool is employed as a saw, and from the possibility to work even under very confined conditions. As a result of the high torques that have to be transmitted to the oscillatory tool, due to the oscillatory movement of the drive, form-locking coupling is normally required between the oscillatory tool and the drive shaft. Although in principle it is of course possible to realize connections of that kind by screwing, it would be desirable to make handling in this respect as simple and quick as possible. Further, it should be possible to realize the connection in the simplest possible way and at the lowest possible cost.

SUMMARY OF THE INVENTION

Accordingly, it is an object of the present invention to disclose an oscillatingly driven hand-held machine tool which allows an easy and quick change of the oscillatory tool without using any additional tool.

It is a second object of the invention to disclose an oscillatingly driven machine tool which can be produced in a simple way and at low cost.

It is a third object of the invention to disclose an oscillatingly driven machine tool which provides for a safe securement of an oscillatory tool to the drive shaft of the machine tool.

These and other objects of the invention are achieved by an oscillatingly driven machine tool, comprising an oscillatory drive for driving a drive shaft about its longitudinal axis, further comprising a flange provided on the drive shaft against which an oscillatory tool can be clamped by spring force via a counter flange, further comprising a displacing mechanism for displacing the counter flange between a working position in which the oscillatory tool can be clamped by a spring between the flange and the counter flange, and a released position in which the counter flange can be detached from the flange.

The object of the invention is perfectly achieved in this way.

The displacing mechanism according to the invention, by which the counter flange can be displaced between a working position and a released position, allows the oscillatory tool to be changed easily by initially moving the flange arranged on the drive shaft to the released position using the displacing mechanism, in which position the counter flange can then be detached from the flange without any need for a tool.

If the oscillatory tool can then be moved back to its working position, the only thing left to be done is to move the displacing mechanism back to its initial position after the counter flange has been fixed on the flange. The counter flange is thereby clamped against the flange by spring force. In this manner, a very simple and quick way of changing the oscillatory tool is achieved.

According to an advantageous further development of the intention, the machine tool comprises a gear case which accommodates the oscillatory drive and from which the drive shaft projects to the outside, the drive shaft comprising a hollow section in which the spring is received externally of the gear case.

This guarantees a simple structure. Especially the arrangement of the hollow section of the drive shaft outside of the gear case allows the spring to be changed easily in case this should become necessary in the event of maintenance work that may become necessary after extended use.

According to another embodiment of the invention, the displacing mechanism comprises a lever having an eccentric engaging a thrust pin allowing axial displacement thereof against the action of the spring.

Preferably, the lever is seated for pivotal movement in this case.

A design of that kind provides a simple structure of the displacing mechanism.

According to a further embodiment of the invention, the thrust pin is provided with a thread onto which the counter flange can be screwed.

That feature allows easy mounting of the counter flange on the thrust pin.

According to a further embodiment of the invention, the drive shaft comprises a hollow section which projects from the gear case and in which the spring is caught between the front end of the hollow section and a shoulder on the thrust pin.

This ensures easy assembly of the spring and a simple structure.

According to a further embodiment of the invention, at least one form-locking element is provided at the outer end of the drive shaft, for positive coupling of the drive shaft.

In a preferred further development of that embodiment at least one form-locking element is provided between the counter flange and the oscillatory tool.

Those features ensure a positive connection between the oscillatory tool and the drive shaft. In this way, even high torques can be transmitted to the oscillatory tool without any problem.

According to a further embodiment of the invention, the spring is designed as a cup spring or as a helical spring.

Especially with the spring designed as a cup spring high spring forces can be achieved in order to guarantee safe clamping of the counter flange against the flange.

It is understood that the features of the invention mentioned above and those yet to be explained below can be used not only in the respective combination indicated, but also in other combinations or in isolation, without leaving the scope of the invention.

BRIEF DESCRIPTION OF THE DRAWINGS

Further features and advantages of the invention will become apparent from the description that follows of a preferred embodiment of the invention, with reference to the drawing. In the drawing:

FIG. 1 shows an illustration, sectioned in part, of a machine tool according to the invention;

FIG. 2 shows a view, sectioned in part, of the drive shaft of FIG. 1, in an enlarged scale;

FIG. 3 shows a view of the thrust pin as shown in FIG. 1, in an enlarged scale; and FIG. 4 shows a sectional view of the counter flange, as shown in FIG. 1, in an enlarged scale.

DESCRIPTION OF PREFERRED EMBODIMENTS

FIG. 1 shows a view of a machine tool according to the invention, sectioned in part in the area of its gear case and generally indicated by reference numeral 10.

The machine tool 10 is designed as a hand-held oscillatory device. It comprises a drive motor 18, the motor shaft 20 of which drives an eccentric 22 via which an oscillating fork 24, connected to rotate together with a drive shaft 26, is driven to perform an oscillating movement. The drive shaft is thereby driven to perform an oscillating swinging driving movement about its longitudinal axis at a high frequency of between approximately 5,000 and 20,000 oscillations per minute and a small angle of swing between approximately 0.5 and 7°.

The drive shaft 26 has a generally cylindrical shape and a cylindrical portion 56 of reduced diameter on its one end, followed by a cylindrical section 55 of larger diameter, which in turn is followed by a step leading to a hollow section 32 of a still further enlarged outer diameter. The cylindrical portion 56 of the drive shaft 26 (FIG. 2) is seated in a bearing 28, while its cylindrical section 55 is seated in a bearing 30. The drive shaft 26 is mounted in the gear housing 14 in such a way that the hollow section 32 of the shaft is held externally of the gear case 14. A displacing device, indicated generally by reference numeral 31, allows the drive shaft 26 to be displaced in axial direction, against the action of a spring 34. The drive shaft 26 is provided with a bore which extends over its full length and in which a thrust pin 36 (FIG. 3) with a cylindrical portion 62 can be displaced in axial direction.

The hollow section 32 of the drive shaft 26 accommodates in its interior a spring element 34 configured as a cup spring, one end of which is retained against the flange portion 38 of the thrust pin 36, while its other end is held by a flange 42 that is screwed by an inner thread 44 onto an outer thread 46 of the hollow section 32. The screwed connection may be secured, for example, by a lock nut or a cotter-pin. The thrust pin 36 is thereby resiliently loaded by the spring element 34 in the direction of the gear case 14. A plurality of form-locking elements 52, formed on the outer surface of the flange 42, opposite the gear case 14, are passed through a mounting opening 50 of a tool 48 thereby providing a form-locking connection with the tool 48. The outer end of the thrust pin 36 is provided with a threaded portion 40 onto which a counter flange 54 is screwed. The side of the counter flange 54 that faces the gear case 14 is provided with recesses 64 adapted to the form of the form-locking elements 52 of the flange 42 so that the counter flange 54 is connected with the flange 42 in form-locking fashion as well.

FIG. 1 shows the machine tool 10 in its operating position in which the pressure pad 36 is not loaded by the displacing mechanism 31 against the spring 34.

The displacing mechanism 31 comprises a lever 33 seated to perform a swinging movement about a pivot axis 35. The lever 33 is further provided with an eccentric 37 that loads the front end 57 of the thrust pin 36. Now, when the lever 33 is pivoted to the outside, in the direction indicated by arrow 39, the thrust pin 36 is displaced outwardly in axial direction, against the action of the spring element 34, so that the counter flange 54 is relieved of the spring action of the spring 34 and can be screwed off the threaded portion 40 manually, without the aid of a tool. The oscillatory tool 48 can then be removed and replaced by another tool.

Now, for returning the machine tool 10 from that released position to its operating position, one initially places the mounting opening 50 of the oscillatory tool 48 on the form-locking elements 52 of the flange 42 and then screws the counter flange 54 down on the threaded portion 40. Thereafter, the lever 33 is returned to the position illustrated in FIG. 1, in a direction opposite to the one indicated by arrow 39, thereby allowing the thrust pin 36 to move back to the outside in axial direction so that the counter flange 54 will be firmly clamped against the flange 42 under the action of the spring 34. At the same time, the recesses 64 of the counter flange 54 are positively engaged by the form-locking elements 52 of the flange 42 in that position, and the mounting opening 50 of the tool 48 is simultaneously engaged by the form-locking elements 52 in form-locking fashion.

When the motor 18 is now switched on to operate the oscillatory drive 16, even high torques can be transmitted to the tool 48 without any risk that the counter flange 54 may get detached from the flange 42.

The fact that the drive shaft 26, the flange 42, the counter flange 54 and the thrust pin 36 are configured as simple turned parts results in easy and low-cost production of the clamping device. In the event the spring 34 should need to be changed after an extended period of operation, for example due to fatigue of the cup springs, such change can be carried out from the outside, without any need to open the gear case.

The flange 42 is simply screwed onto the outer thread 46 of the drive shaft 26 and is fixed against rotation by screwed connections 60. Alternatively, there is also the possibility to use a lock nut (not shown) on the outer thread 46, for example.

It goes without saying that in the working position there is a small gap between the eccentric 37 and the end 57 of the thrust pin 36 facing the eccentric 37 (although not shown in FIG. 1), to avoid friction during operation.

What is claimed is:

1. A machine tool comprising:
   an oscillatory drive received within a gear case and being configured for driving a drive shaft oscillatingly about its longitudinal axis;
   a flange secured detachably at an outer end of said drive shaft;
   a thrust pin received axially displaceable within the drive shaft;
   a shoulder provided on said thrust pin;
   a counter flange secured detachably at a first outer end of said thrust pin;
   a spring caught between said shoulder of said thrust pin and said flange for biasing said thrust pin in a direction for pressing said counter flange against said flange; and
   a displacing mechanism for displacing said thrust pin between a working position and a released position, wherein in said working position said counter flange is biased by said spring against an oscillatory tool resting against said flange of said drive shaft for clamping said oscillatory tool between said flange and said counter flange under the action of said spring, and wherein in said released position said thrust pin is axially displaced for releasing said counter flange from the bias of said spring, thereby allowing said counter flange to be detached from said thrust pin and said oscillatory tool to be removed from said drive shaft;

wherein said drive shaft comprises a hollow section projecting outwardly from said gear case, and wherein said spring is received in said hollow section of said drive shaft externally of said gear case;

wherein said flange further comprises at least one form-locking element configured for positive coupling with a mounting opening provided on an oscillatory tool attached to said drive shaft and resting against said flange; and wherein said counter flange comprises at least one form-locking counter element mated to said form-locking element of said flange allowing positive coupling between said flange and said counter flange;

wherein said displacing mechanism comprises an eccentric that directly engages a second outer end of said thrust pin opposite said first outer end of said thrust pin.

2. A machine tool comprising:
an oscillatory drive configured for driving a drive shaft oscillatingly about its longitudinal axis;
a flange secured detachably at an outer end of said drive shaft;
a thrust pin received axially displaceable within the drive shaft;
a counter flange secured detachably at an outer end of said thrust pin;
a spring held between said thrust pin and said flange for biasing said thrust pin in a direction for pressing said counter flange against said flange; and
a displacing mechanism for displacing said thrust pin between a working position and a released position, wherein in said working position said counter flange is biased by said spring against an oscillatory tool resting against said flange of said drive shaft for clamping said oscillatory tool between said flange and said counter flange under the action of said spring, and wherein in said released position said thrust pin is axially displaced for releasing said counter flange from the bias of said spring, thereby allowing said counter flange to be detached from said thrust pin and said oscillatory tool to be removed from said drive shaft.

3. The machine tool of claim 2, further comprising a gear case wherein said oscillatory drive is enhoused, wherein said drive shaft comprises a hollow section projecting outwardly from said gear case, and wherein said spring is received in said hollow section of said drive shaft externally of said gear case.

4. The machine tool of claim 2, wherein said displacing mechanism comprises a lever engaging said thrust pin allowing axial displacement thereof against the action of said spring.

5. The machine tool of claim 4, wherein said lever is seated for pivotal movement.

6. The machine tool of claim 5, wherein said lever comprises an eccentric engaging an end face of said thrust pin allowing axial displacement thereof when said lever is pivoted.

7. The machine tool of claim 2, wherein said thrust pin at its outer end comprises a thread allowing screw-attachment of said counter flange.

8. The machine tool of claim 2, wherein said thrust pin comprises a shoulder, and wherein said spring is caught between said shoulder of said thrust pin and said flange secured to said outer end of said drive shaft.

9. The machine tool of claim 2, wherein said flange comprises at least one form-locking element configured for positive coupling with an oscillatory tool attached to said drive shaft and resting against said flange.

10. The machine tool of claim 9, wherein said oscillatory tool comprises a mounting opening.

11. The machine tool of claim 10, wherein said mounting opening is mated to said form-locking element of said flange for positive engagement therewith.

12. The machine tool of claim 9, wherein said counter flange comprises at least one form-locking counter element mated to said form-locking element of said flange allowing positive coupling between said flange and said counter flange.

13. The machine tool of claim 2, wherein said spring is configured as a cup spring.

14. The machine tool of claim 2, wherein said spring is configured as a helical spring.

15. The machine tool of claim 11, wherein said counter flange comprises at least one form-locking counter element mated to said form-locking element of said flange allowing positive coupling between said flange and said counter flange.

16. A machine tool comprising:
an oscillatory drive received within a gear case and being configured for driving a drive shaft oscillatingly about its longitudinal axis;
a flange secured detachably at an outer end of said drive shaft;
a thrust pin received axially displaceable within the drive shaft;
a counter flange secured detachably at an outer end of said thrust pin;
a spring held between a flange portion of said thrust pin and said flange for biasing said thrust pin in a direction for pressing said counter flange against said flange; and
a displacing mechanism for displacing said thrust pin between a working position and a released position, wherein in said working position said counter flange is biased by said spring against an oscillatory tool resting against said flange of said drive shaft for clamping said oscillatory tool between said flange and said counter flange under the action of said spring, and wherein in said released position said thrust pin is axially displaced for releasing said counter flange from the bias of said spring, thereby allowing said counter flange to be detached from said thrust pin and said oscillatory tool to be removed from said drive shaft;
wherein said drive shaft comprises a hollow section projecting outwardly from said gear case, and wherein said spring is received in said hollow section of said drive shaft externally of said gear case.

17. The machine tool of claim 16, wherein said displacing mechanism comprises a lever engaging said thrust pin allowing axial displacement thereof against the action of said spring.

18. The machine tool of claim 17, wherein said lever is seated for pivotal movement.

19. The machine tool of claim 17, wherein said lever comprises an eccentric engaging an end face of said thrust pin allowing axial displacement thereof when said lever is pivoted.

20. The machine tool of claim 19, wherein said thrust pin at its outer end comprises a thread allowing screw-attachment of said counter flange.

* * * * *